United States Patent
Balakrishnan (10) Patent No.: US 8,930,964 B2
(45) Date of Patent: Jan. 6, 2015

(54) AUTOMATIC EVENT CORRELATION IN COMPUTING ENVIRONMENTS

(75) Inventor: Sandhya Balakrishnan, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 13/562,942

(22) Filed: Jul. 31, 2012

(65) Prior Publication Data

US 2014/0040916 A1 Feb. 6, 2014

(51) Int. Cl.
*G06F 13/00* (2006.01)
(52) U.S. Cl.
USPC .......................................................... 719/318
(58) Field of Classification Search
CPC ........................................................ G06F 9/542
USPC ............................................................ 719/318
See application file for complete search history.

(56) References Cited

U.S. PATENT DOCUMENTS

| | | | |
|---|---|---|---|
| 7,043,661 B2 | 5/2006 | Valadarsky et al. | |
| 7,284,048 B2 | 10/2007 | Jakobson et al. | |
| 7,730,007 B2 | 6/2010 | Salahshour et al. | |
| 8,032,779 B2 | 10/2011 | Clemm et al. | |
| 2007/0288467 A1 | 12/2007 | Strassner et al. | |
| 2009/0119307 A1* | 5/2009 | Braun et al. | 707/100 |
| 2009/0171704 A1 | 7/2009 | Bobak et al. | |
| 2011/0314148 A1 | 12/2011 | Petersen et al. | |
| 2013/0282739 A1* | 10/2013 | Anderson et al. | 707/755 |

* cited by examiner

*Primary Examiner* — Andy Ho (57) ABSTRACT

Systems and methods of automatic event correlation for computing environments are disclosed. An example method may include parsing an event message to identify an event, and marking the event message when the event is related to a previous event. The method may also include adding the marked event message to a trail of events. The method may also include parsing the trail of events. The method may also include changing the marked event message when parsing the trail of events confirms a condition in the computing environment.

25 Claims, 4 Drawing Sheets

| Severity | Event | Patterns |
|---|---|---|
| Medium | Router Rebooting | Reboot |
| Medium | NIC Restarting | Restart |
| ... | | |

310

| Severity | Event | Patterns |
|---|---|---|
| Critical | Disk space nearing capacity | Disk Space |
| Critical | Tablespaces with free space percentage too low | Table Space |
| ... | | |

320

| Severity | Event | Patterns |
|---|---|---|
| Low | Application aborted | Application |
| Low | Application started | Application |
| ... | | |

330

300

AUTOMATIC EVENT CORRELATION IN COMPUTING ENVIRONMENTS

BACKGROUND

Information technology (IT) personnel are often called on to trace problems in a computing environment and determine the cause. The analysis often depends on the type of data available to the IT personnel, and the experience and prior knowledge of the IT personnel. This approach demands domain expertise and a working knowledge of the computing environment being analyzed. Multi-vendor and "cloud" computing environments can be complex, and often change over time when devices are replaced, reconfigured, updated, moved, and/or new devices are added. These factors can make troubleshooting even more difficult. Typically, the results from troubleshooting one problem are inapplicable to aid in identifying other problems which may arise in the future.

DETAILED DESCRIPTION

Intelligent monitoring solutions in a variety of systems and devices may generate event messages. These event messages can be used both reactively and proactively to alert or avert potential problems in computing environments. But even with these event messages, IT personnel may need to spend lot of time and effort analyzing events to respond to anomalies.

Event processing to identify critical and relational events can be an even more challenging task when there are a large number of events (referred to as an "event storm"), and during outages when a large number of inconsequential event messages (e.g., "device restarting") may be generated by the affected components. By way of example, consider a relatively small data center with ten server systems. If each of these systems issues five event messages per day on average, there are on average one-hundred event messages issued every day. During an outage, there may be even more events. Manually reviewing all of these events is a grueling task, and can be error-prone.

Now consider a computing environment, such as a data center with even more servers (executing any number of applications), multiple network paths (and associated communications devices such as network interfaces, routers, and switches), and storage systems (such as virtual storage). The number of events can increase exponentially. In some cases, it may even be humanly impossible to identify critical events and root cause the problem in a timely manner.

The systems and methods described herein provide automated event correlation, which may be implemented in a software tool. The software tool may be used across multiple, distinct computing environments, and addresses changes to the computing environments over time (e.g., when newer technologies are adopted, such as clustering, virtualization, and cloud computing). The software tool also supports an array of hardware and/or software provided by multiple different vendors in the same computing environment. The software tool also adapts to handle new event messages, and can be used to identify potential issues both reactively (to root cause an already existing issues) and proactively (to identify and even prevent potential issues from occurring).

Automatic event correlation provides a successful event management tool which minimizes or altogether eliminates error-prone manual efforts, proactively alerts personnel to impending danger, and can evolve to support changing environments. The systems and methods described herein analyze data extensively to help IT personnel understand event patterns, and binds related events together to provide meaningful and manageable event data that can be readily implemented by IT personnel to make management decisions. Accordingly, the systems and methods can help organizations operate more efficiently and cost effectively. The output can help in discovering symptoms that can lead to an anomaly or even complete failure in computing environments, thus proactively thwarting the negative effects of such anomalies or failures.

Before continuing, it is noted that as used herein, the terms "includes" and "including" mean, but is not limited to, "includes" or "including" and "includes at least" or "including at least." The term "based on" means "based on" and "based at least in part on."

Figure 1:
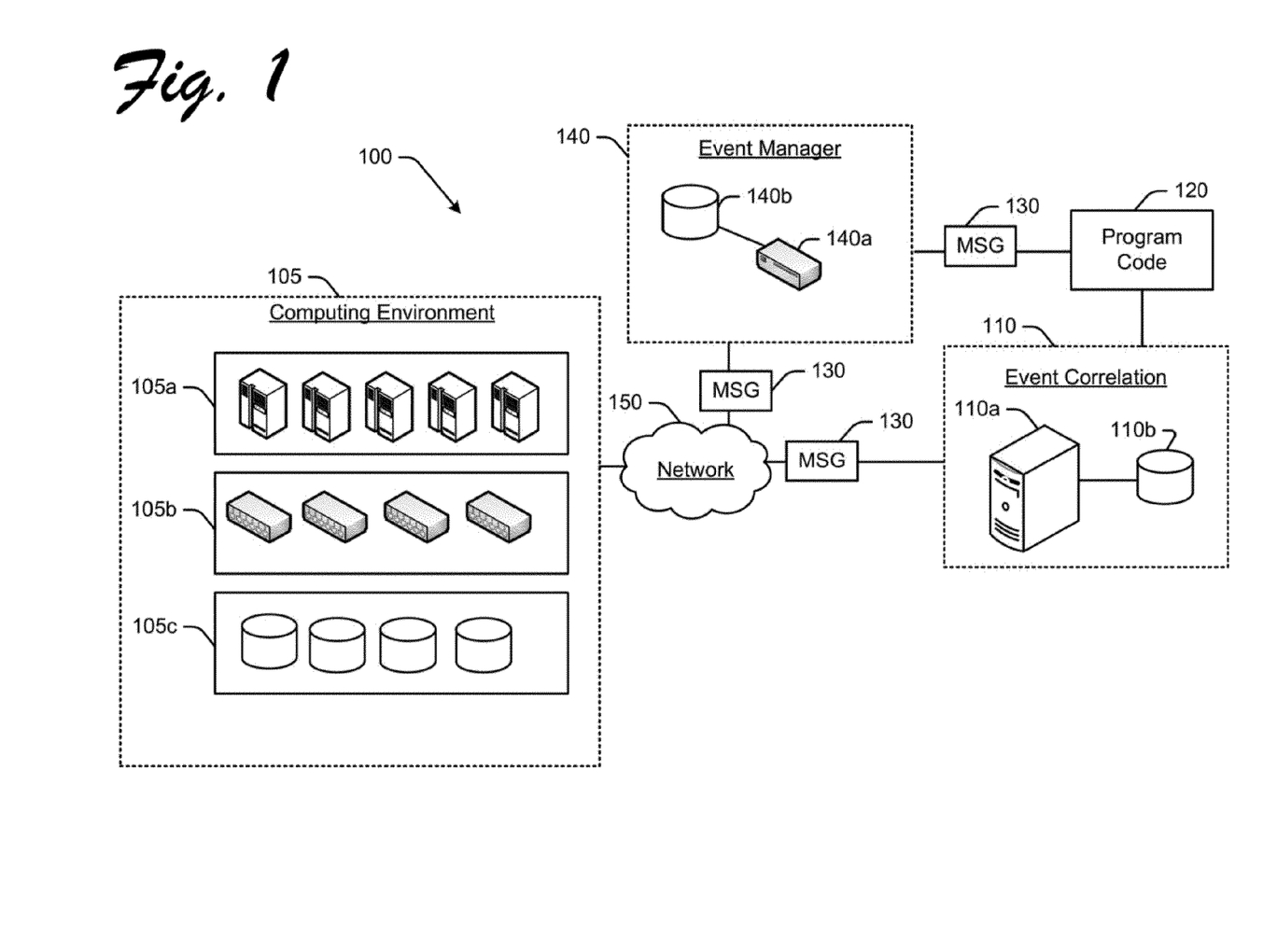
FIG. 1 is a high-level illustration of an example system which may implement automatic event correlation in a computing environment.

FIG. 1 is a high-level illustration of an example system 100 which may implement automatic event correlation in a computing environment 105. The system 100 may include an event correlation subsystem 110 including a processor 110*a* operatively associated with computer readable media 110*b*, and configured to execute program code 120 to analyze event messages 130 received from an event manager 140.

In an example, the event manager 140 may include a processing device 140*a* operatively associated with a repository 140*b*. The event manager 140 may be configured to receive event messages 130 from the computing environment 105. The event manager 140 may store event messages 130 in the repository 140*b* and/or pre-process the event messages 130 (e.g., at the processing device 140*a*).

It is noted that the event manager 140 does not need to pre-process the event messages 130 and/or does not need to store the event messages 130 in the repository. In an example, the event manager 140 may pass the event messages to the program code 120 executing by the event correlation subsystem 110. In another example, the event correlation subsystem 110 may receive some or all event messages 130 directly from the computing environment 105.

In an example, the computing environment 105 is implemented as a multi-vendor management environment or cloud computing environment, such as an enterprise computing system(s) or multi-user data center(s). These computing systems offer a consolidated environment for providing, maintaining, and upgrading hardware and software for the users, in addition to more convenient remote access and collaboration by many users. These computing systems also provide more efficient delivery of computing services. For example, it is common for the processor and data storage for a typical desktop computer to sit idle over 90% of the time during use. This is because the most commonly used applications (e.g., word processing, spreadsheets, and Internet browsers) do not require many resources. By consolidating processing and data storage in a computing environment such as a data center, the same processor can be used to provide services to multiple users at the same time.

The computing environment 105 is shown including a plurality of servers 105*a*, a plurality of network devices 105*b*, and a plurality of storage devices 105*c*. It is noted that the servers 105*a*, network devices 105*b*, and storage devices 105*c* are shown for purposes of illustration and are not intended to be limiting. The computing environment 105 may include any number and type of devices, systems, subsystems, and/or executing code (e.g., software applications), just to name a few examples of equipment and infrastructure. The number and type of resources provided in computing environment 105 may depend at least to some extent on the type of customer, number of customers being served, and the customer requirements. The computing environment 105 may be any size. For example, the computing environment 105 may serve an enterprise, the users of multiple organizations, multiple individual entities, or a combination thereof.

Regardless of the physical configuration of the computing environment 105, communications are typically network-based. The most common communications protocol is the Internet protocol (IP), however, other network communications may also be used. Network communications may be used to make connections with internal and/or external networks. Accordingly, the computing environment 105 may be connected by routers and switches and/or other network equipment 121 that move network traffic between the servers and/or other computing equipment, data storage equipment, and/or other electronic devices and equipment in the data center 105 (referred to herein generally as "computing infrastructure").

In an example, event correlation subsystem 110 may be connected to the computing environment via a network, such as an external network 150 either directly or via an event manager 140. In another example, the event correlation subsystem 110 may be included as part of the computing environment 105 (e.g., connected via an internal network).

It is noted that the event correlation subsystem is not limited to use with any particular type, number or configuration of facilities infrastructure. The computing environment 105 shown in FIG. 1 is provided as an illustration of an example operational environment, but is not intended to be limiting in any manner.

A purpose of the computing environment 105 is providing facility and computing infrastructure for end-users with access to computing resources, including but not limited to data processing resources, data storage, and/or application handling. An end-user may include anybody (or any entity) who desires access to resource(s) in the computing environment 105. The end-users may also include anybody who desires access to a service provided via the computing environment 105. Providing the end-users access to the resources may also include provisioning of the resources, e.g., via file servers, application servers, and the associated middleware. This also means that the end-users are depending on reliable service from the computing environment.

During use, various elements of computing environment 105 may issue event messages 130 to notify an operator of an event in the computing environment 105. An operator may include anybody (or any entity), or plurality thereof, responsible for managing the computing environment 105. For purposes of illustration, an operator may be a network administrator or administrators. The network administrator may be in charge of managing communication elements to provide consistent networking on behalf of the users. In another example, the operator may be an engineer in charge of deploying and managing processing and data storage resources for the users. The function of the operator may be partially or fully automated.

The operator may use information about the event (e.g., an event object and corresponding event state) in the event messages 130 to identify an operating condition (or conditions), which may lead to an anomaly in the computing environment 110. An event message may indicate a "soft event" (e.g., relating to software), a "hard event" (e.g., relating to hardware), or have elements of both a soft event and a hard event. The event message 130 may specify a single parameter, or multiple parameters, such as an error or status parameter describing the event. In an example, the parameters are expressed as text strings.

By way of illustration, the event message 130 may indicate an outage condition (e.g., expressed in a text string stating "Device1_Power Off"). An outage condition such as this is a rather simple example, and the response may include addressing the outage (e.g., by restarting the affected component). The event message may also be inconsequential in terms of a condition in the computing environment 105 (e.g., simply indicating that a device has come back online after an outage).

A condition in the computing environment 105 may be more complex than indicated by the event itself. For example, a message may describe resource usage by a database application. By itself, the event (current resource usage) may not indicate any immediate negative effect. However, analyzing a number of messages temporally (e.g., in a time window) may indicate a trend which may ultimately result in an error condition (e.g., a lack of capacity in a storage system).

Analyzing event messages 130 may allow early detection of a condition (e.g., an error condition) and prediction of an anomaly, so that the underlying issues can be addressed in advance. As such, the computing environment 105 (or device(s) in the computing environment) can be configured and/or reconfigured on an ongoing basis to provide reliable and consistent access to the desired resources by the user. In the example given above, additional storage capacity may be allocated in advance of a database application overwhelming existing storage capacity.

The analysis may be implemented by program code 120, which may be stored on any suitable computer readable media and executed by any suitable computing device (e.g., provided by the event correlation subsystem 110). During execution of the program code 120, the event correlation subsystem 110 "learns" from events and adapts to a dynamic operating environment. Filtered events can be analyzed to find symptoms of a condition that may lead to an anomaly. Event messages 130 may be stored in a "container" (e.g., the repository 140*b*) and updated when the underlying cause of the event changes. Correlated events can be memorized to automate correlation.

In an example, the event correlation subsystem 110 normalizes events indicated in a plurality of event messages 130, and then pinpoints a set of "special" events that may be of interest to automate correlation. Automating correlation may be achieved by labeling the event message based on each of a two-part parsing scheme, to produce a trail of events used to identify relations in the trail of events. In an example, a technique referred to herein as "colored parsing" is utilized. Colored parsing of event messages 130 is described in more detail below. Briefly, the parsed event messages are uniquely coded or colored (e.g., "yellow" and "red") to produce a "trail" of events suggesting a possible relation between the events. These events, after a series of analysis, may be presented to the operator (e.g., in an event browser, shown in FIG. 3) as correlated events, strong relational events, and weak relational events. From these events, the operator can view the automatically correlated events, automate a new correlation from the strong relational events, add new keywords to a dictionary for use in similar event correlations, save weak relational events for later analysis and discard inconsequential events. However, the operations described herein are not limited to any specific implementation.

Figure 2:
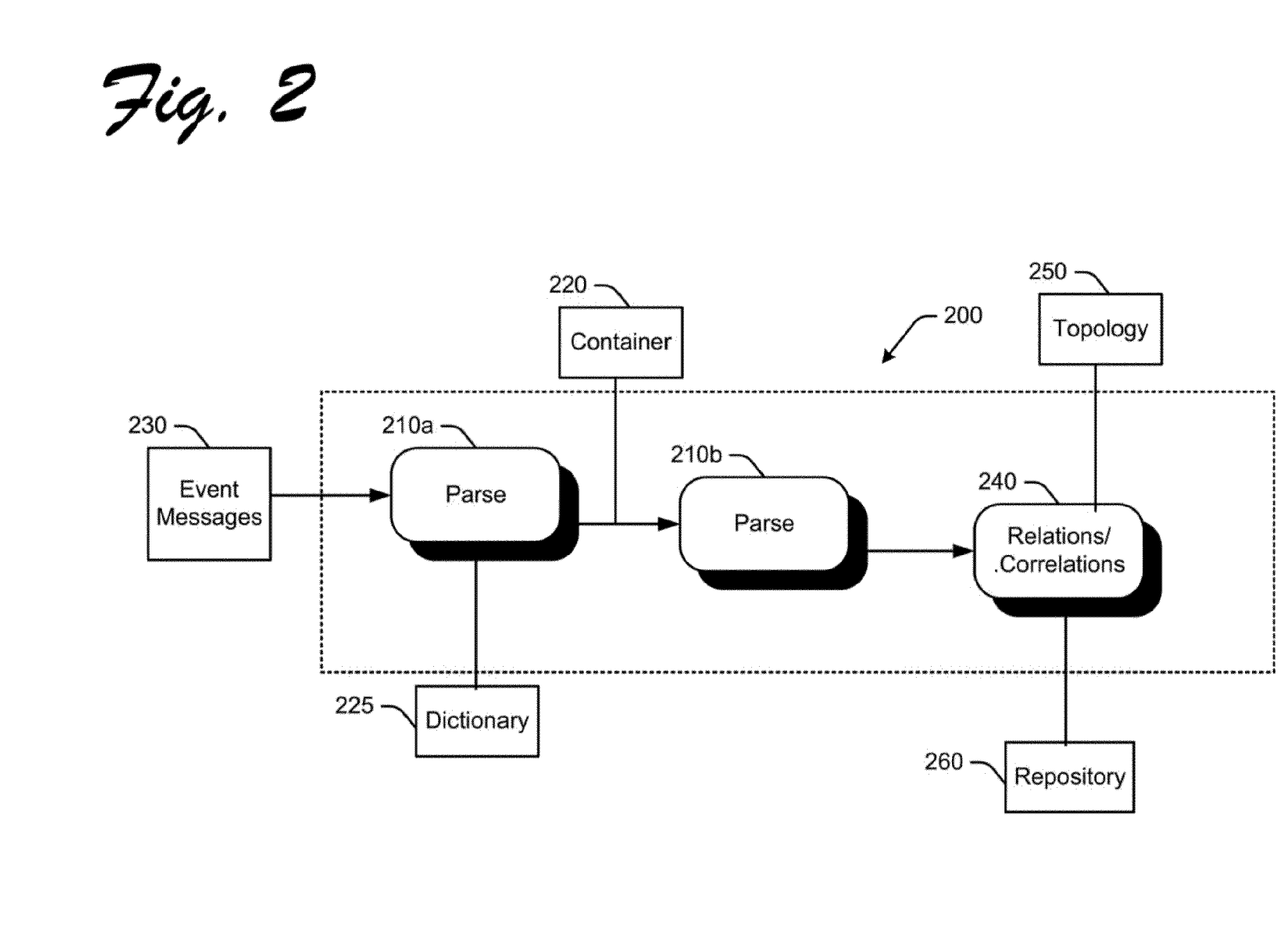
FIG. 2 is a process-flow diagram illustrating example implementation of automatic event correlation by an architecture of machine readable instructions.

FIG. 2 is a process-flow diagram 200 illustrating example implementation of automatic event correlation by an architecture of machine readable instructions. In an example, the program code 120 discussed above with reference to FIG. 1 may be implemented in machine-readable instructions (such as but not limited to, software or firmware). The machine-readable instructions may be stored on a non-transient computer readable medium and are executable by one or more processor to perform the operations described herein. It is noted, however, that FIG. 2 is provided only for purposes of illustration of an example operating environment, and is not intended to be limiting.

The program code may execute the function of the architecture of machine readable instructions as self-contained modules. These modules can be integrated within a self-standing tool, or may be implemented as agents that run on top of an existing program code. In an example, modules may include a first parsing module 210a, a second parsing module 210b associated with the first parsing module 210a and a container for correlation expressions 220.

Briefly, the first parsing module 210a receives event messages 230 for the computing environment as described above with reference to FIG. 1. The first parsing module 210a may "color" event objects and event states from temporally classified events, using an "event dictionary" 225 (also referred to herein as a "dictionary"), and update the container 220. The second parsing module 210b follows a trail using correlation expressions from the first parsing, and generates a set of relational events. The second parsing module 210b may also insert message "hints" from a previous learning.

In an example, the first and second parsing may output (a) automated correlation events, (b) strong relational events, and (c) weak relational events (reference 240 in FIG. 2), which can be used for automatic event correlation and generating new correlations (reference 250 in FIG. 2). For example, a topology map 250 may be provided to the IT personnel to address configuration items. The program code may generate a topology map of configuration items (CIs) to aid in identifying a root cause of issues and potential issues for maintaining operations of a computing environment. In another example, generating new correlations may be used in a feed-back approach to update a repository 260 of correlated events from past or historical data. The correlation repository 260 is where the tool learns and automates events. When the operator identifies correlated events, the operator can push these correlated events into the correlation repository 260 for future use. This is how the tool adapts and learns continuously.

In another example, generating new correlations may be used in a feed-back approach to update the dictionary 225. These and other operations of evaluating event messages 230 by the architecture of machine readable instructions 200 may be better understood with reference to the following examples.

In an example, event messages 230 may include text or strings of text with at least some information about the event, such as a configuration item object. The event messages 230 may be descriptive and have at least a hint about what is causing the event. Consider Event1 and Event2 shown below for purposes of illustration:

Event1: [Processing (Veritas Master: sqfbkp01 Client: wsqfsrm1b Status: 129—Disk storage unit is full)]

Event2: [Tablespaces with free space percentage too low in DBA930C most serious is PERM tablespace at 80%]

It can be seen in these examples that the event messages 230 may include natural language text describing the event for one of the computing environment elements.

As another illustration, event messages 230 from different domains may describe the same event object or configuration item, but use different terms. For example, event messages 230 may describe "Disk Space" as just "Space," or describing a "Database" as just "DB" or even using the instance name directly. Consider Event3 shown below for purposes of illustration:

Event3: DBSPI10-82: Data logging failed for DBSPI_1

But it is also possible that some messages are non-descriptive. Accordingly, the event messages 230 may be pre-filtered to place a lower weight or altogether remove these event messages 230 from the analysis.

In addition, various computing environments may operate according to different rules. Accordingly, a constant set of event keywords cannot be used to properly address the entire gamut of event messages generated in any particular environment. As such, the program code may utilize dictionary 225, including a list of codes, terms, keys, and conditions which are commonly used in the IT domain, and which text strings may be encountered in the event messages 230. Creation of the dictionary 225 may be automated by the program code to learn about the particular environment and identify relevant codes and conditions in event messages. In an example, it is also possible for the user to add keywords into the dictionary 225 so that the dictionary is "custom" or "semi-custom."

The dictionary 225 may be generated, and updated, by parsing the event history 260 to discover event objects and corresponding event states (e.g., objects occurring alongside a state). Event Objects are key objects or configuration items (CIs), such as but not limited to, CPU, Database, Node, and Cluster. Event States are the corresponding state(s) of these objects, such as but not limited to, on/off, empty/full, up/down, failover, and exceeded.

In an example, an Event Object and its synonyms may be considered to be referring to the same object. This helps ensure that even if event messages 230 from different domains use different terms for the same object, the event is not ignored. Other correlation techniques may also be used, such as but not limited to, temporal analysis, event de-duplication, state based correlation and topology based correlation. These techniques can additionally benefit the automated correlation technique by further narrowing the final set of event candidates.

During operation, the program code may parse event messages and correlate Event Objects to Event States. In an example, parsing may be temporal in nature (e.g., in a time window) because event messages issued in a given time range may be a consequence of one another. This is true most of the time, because related event messages are commonly issued in close proximity to one another on a temporal basis.

In an example, the program code may use colors during parsing. The colored parsing technique may be implemented in a two-step process. In the first parse, events are searched for certain cue words (event objects and event states) from the dictionary. When a match is identified, these events are colored (e.g., yellow). The event object name (or configuration item CI) is saved in the correlation expression container 220, which becomes a link to a possible correlation.

For purposes of illustration, parsing may be implemented on the following example Event4:

Event4: Disk space usage nearing capacity on this system—YellowEvent

A corresponding entry is made to the correlation expression container, as follows:

| COR1 | Diskspace |
| --- | --- |

In subsequent parsing, if the memorized event object is associated with a new event object, then a link may be established between these events, as illustrated by the following example:

Event5: Tablespaces with free space percentage too low in DBA930C most serious is PERM tablespace at 80%—YellowEvent Therefore, the new Event object is also saved to the correlation expression, as follows:

| COR1 | Diskspace, Tablespace |
|---|---|

In the above illustration, the text string "space" was discovered earlier (Disk space and space were added to the dictionary 225 as synonyms), and is now appearing in another event which has a new event object "Tablespace." The program code learns this, and adds the terms to the container 220 as a possibility for correlation. A correlation expression container is updated accordingly.

In this manner, relations between events are detected in a first parse marking events, and leaving behind a distinct (e.g., yellow) trail. Event messages 230 may also be checked for indications of an already memorized correlation, which can be automated in the final analysis. These events may be marked whenever objects from a memorized correlation are detected.

Following the first parse, there are a number of yellow colored events, based on a few correlation expressions including event objects which display an association with each other. The event is colored red if a match is found from the correlation expression container and that expression has more than one object referenced.

The second parse follows the trail of yellow colored events. Using the correlation expressions constructed during the first parse, the yellow trail is transformed into a red trail if a match is found with an object from one of the correlation expressions in the container 220. For example, Event5 and Event 6 may include:

Event5: Disk space usage nearing capacity on this system—RedEventCOR1

Event6: Tablespaces with free space percentage too low in DBA930C most serious is PERM tablespace at 80%—RedEventCOR1

The event is then marked with a unique identifier (e.g., COR1) to distinguish from one correlation to another. For purposes of illustration, Event5 and Event 6 may be marked as follows:

| COR1 | Disk, Tablespace |
|---|---|

At the end of second parse, events may be categorized as clusters. For example, a cluster of high relational events (e.g., COR1 and COR2) may be colored red and grouped using a memorized correlation. A cluster of high relational events (e.g., COR1 and COR2) may be colored red and grouped using a unique identifier suggesting a possible correlation. Weak relational events may be colored yellow because no associations with other events were found. Events that are not colored can be ignored and/or used for later analysis. Weak relational events may be colored yellow because no associations with other events were found, these may be used for later analysis. Events that are not colored can be ignored and/or used for later analysis.

Events classified by this technique may be used in a topology map 250 to display for a user a relation to each other. For example, the objects in question may be from different sources. For example, if multiple events describe a processor error, these events may be from different processors or from multiple systems in the user environment (e.g., may not be in the same topology). Thus, a relationship may be established in the topology map 250. The topology map 250 can then be used to understand topological classification of events. These events are used in a final analysis of topological classification for event correlation. That is, when the colored events appear in a given topological view, then a manageable set of events may be presented to the operator, for example, in an event browser.

Figure 3:
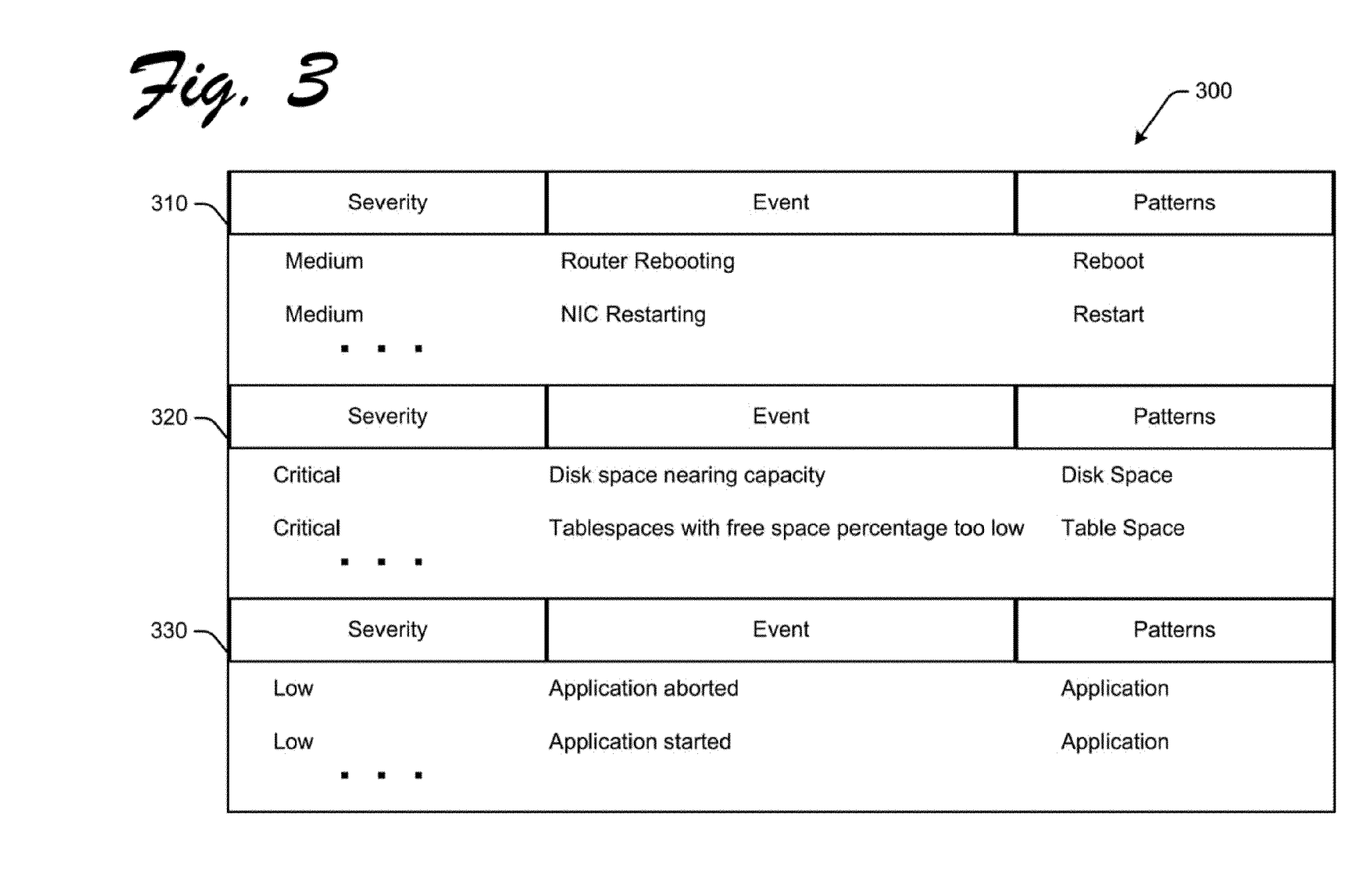
FIG. 3 is a screen shot showing output from an example event browser which may be used by an operator during automatic event correlation.

FIG. 3 is a screen shot showing output from an example event browser 300 which may be used by an operator for automatic event correlation. In an example, the event browser 300 may include a window 310 for outputting automated correlation of events, a window 320 for outputting strong relational events, and a window 330 showing weak relational events. The window 310 may display events that have already been learned (e.g., red events that are found in the correlation repository from FIG. 2). In the example shown in FIG. 3, the events are related to the network. The window 320 may display events that have been seen before, but have not yet been determined to have a strong correlation (e.g., re events that are not found in the correlation repository 260 from FIG. 2). In the example shown in FIG. 3, the events are related to storage capacity. The window 330 may display events that may have a correlation, but have not yet been determined to have any correlation (e.g., yellow events). In the example shown in FIG. 3, the events are related only generally by type, as software applications. The operator (e.g., IT personnel) can use the event browser 300 to view events, validate event correlations, check for possible correlation of events, and create new correlations.

In addition, the operator may use the event browser 300 to add "hints" or indicators into event messages to automate confirmed correlated events as correlation rules. When the correlation is validated and confirmed by the operator, the messages can be processed to insert Event Type Indicators and related configuration item hints, for example, in a custom message attributes window, so that these events can be automatically correlated. The operator may also use the event browser 300 for reactive processing by creating new CI types.

The operator may also use the event browser 300 to review archived messages and proactively identify important keywords. For example, when the event messages have been processed, and the final parsing has only yellow events and no red events, this could mean that the events are not related or the dictionary might be missing the keywords. In this case, the operator may use the event browser 300 to look at historical events and update the dictionary 225 with keywords from yellow colored events.

The systems and methods described herein have been described as a tool which may be used to automate event correlation, thereby reducing the cost incurred for domain expertise to manually evaluate events. The tool offers the ability to identify potential anomalies based on events, before those events become an anomaly or problem affecting the computing environment. The tool is not tied to fixed rules, and adapts dynamically (through use over time) to new components and even entirely different environments, without having to redevelop the tool for evolving technologies. The tool may also provide an event browser for simplicity and ease of use by the operator.

Before continuing, it should be noted that the examples described above are provided for purposes of illustration, and are not intended to be limiting. Other devices and/or device configurations may be utilized to carry out the operations described herein.

Figure 4:
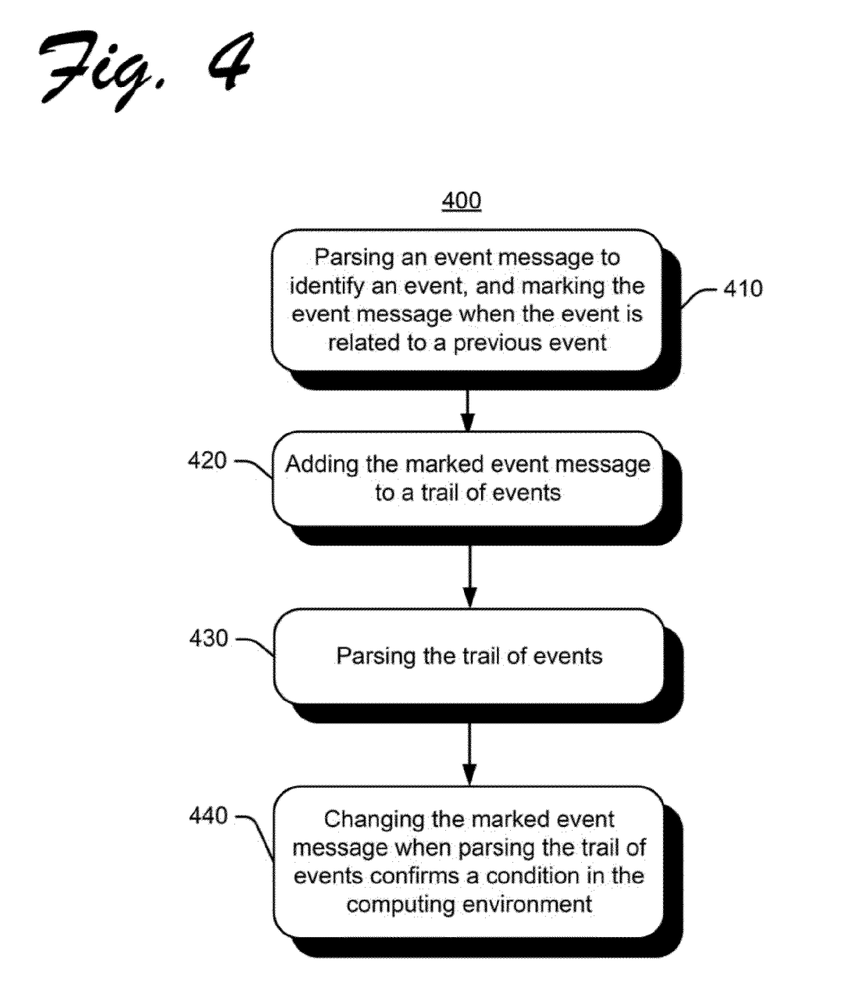
FIG. 4 is a flowchart illustrating example operations which may implement automatic event correlation.

FIG. 4 is a flowchart illustrating example operations which may be implemented for automatic event correlation. Operations 400 may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

Operation 410 includes parsing an event message to identify an event, and marking the event message when the event is related to a previous event. The event may include information for a configuration item or an event object. Operation 420 includes adding the marked event message to a trail of events. The condition may indicate an anomaly. Operation 430 includes parsing the trail of events. In an example, temporal analysis may be utilized wherein parsing is during a predetermined time window. Operation 440 includes changing the marked event message when parsing the trail of events confirms a condition in the computing environment. For example, marking (or labeling) may include coloring the event message when a pattern is identified. For example, the event message may be colored yellow. The color of the event message may be changed (e.g., from yellow to red) when the pattern is a consequence of another event. Operations may also include marking the event message with a unique identifier (e.g., COR1 or COR2) to distinguish correlations from one another. High relational events may be clustered.

By way of illustration, using colors for parsing may be used to identify specific patterns in event messages. Events may also be considered in a given time window. If events occur repeatedly in a given time window it implies that some events could be a consequence of one another. On this filtered set of events, the colored parsing technique can be applied as part of a two-part parsing.

During the first parsing, the events are searched for by parsing cue words (e.g., event objects and event states) from the dictionary. Once a match occurs, these events are colored yellow. The event object name (or CI) is saved in a "correlation expression" container which goes on to become one of the links to a possible correlation.

In a subsequent event parsing, if the memorized event object is associated with a new event object then this provides a link between these events. Therefore, the "new" event object may also be saved to the correlation container.

In an example, the word "space" was discovered in an earlier event message (e.g., "Disk space" and "space are added as synonyms), and is now appearing in another event which has a new event object "Tablespace". The method includes learning this and adding the event message as a possibility for correlation. For example, the correlation expression container may be updated. In this manner, relations between events can be detected in a first parse, marking events and leaving behind a distinct trail. In addition, events may also be checked for indications of an already memorized correlation which can be automated in the final analysis. Whenever objects from a memorized correlation are detected, these events are marked as well.

At the end of first parse, there is a series of yellow colored event messages, and a few correlation expressions including event objects displaying an association with each other.

During the second parse the pattern starts to unfold. The second parse follows the trail of yellow colored events. Using the correlation expressions built from the first parse, the yellow trail is transformed into a red trail if a match is found with an object from one of the correlation expressions in the correlation container. The event message is then marked with a unique identifier (e.g., COR1, and COR2) to distinguish correlations from one another.

The operations shown and described herein are provided to illustrate example implementations. It is noted that the operations are not limited to the ordering shown. Still other operations may also be implemented.

Further operations may include accessing the dictionary for parsing the event message. The dictionary may be updated based on parsing the event message for the condition. As such, the system is dynamic and adjusts to changing conditions in the computing environment. For example, the dictionary may be updated for new components brought online, and/or when new text strings occur in event messages. Operations may also include mapping events using a topological classification for event correlation.

The operations may be implemented at least in part using an end-event browser (e.g., web-based interface). In an example, the end-user is able to make predetermined selections, and the operations described above are implemented on a back-end device to present results to a user. The user can then make further selections. It is also noted that various of the operations described herein may be automated or partially automated.

It is noted that the examples shown and described are provided for purposes of illustration and are not intended to be limiting. Still other examples are also contemplated.

The invention claimed is:

1. A method of automatic event correlation in a computing environment, comprising:
    parsing an event message to identify an event, and marking the event message when the event is related to a previous event;
    adding the marked event message to a trail of events;
    parsing the trail of events; and
    changing the marked event message when parsing the trail of events confirms a condition in the computing environment.

2. The method of claim 1, wherein marking the event message comprises coloring the event message when a pattern is identified.

3. The method of claim 2, wherein marking the event message comprises changing color of the event message when the pattern is a consequence of another event.

4. The method of claim 2, wherein coloring the event message describes a plurality of event messages as automated correlation events, strong relational events, and weak relational events.

5. The method of claim 1, wherein marking the event message is with a unique identifier to distinguish correlations from one another.

6. The method of claim 1, further comprising clustering high relational events in the trail of events.

7. The method of claim 1, further comprising temporally parsing event messages, wherein each parsing of the event message is during a predetermined time window.

8. The method of claim 1, further comprising:
    updating a dictionary based on parsing the event message; and
    accessing the dictionary in a subsequent parsing of event messages.

9. The method of claim 1, further comprising mapping events using a topological classification to correlate events.

10. The method of claim 9, wherein mapping events using a topological classification to correlate events further comprises generating a topology map of configuration items identifying a root cause of issues and potential issues for maintaining operations of a computing environment.

11. The method of claim 1, wherein the event message includes information of a configuration item or an event object.

12. The method of claim 1, wherein the condition indicates an anomaly in the computing environment.

13. The method of claim 1, further comprising parsing the event message by a first parsing module before storing correlation expressions in a container.

14. The method of claim 13, further comprising parsing the event message from the first parsing module at a second parsing module to follow a trail using correlation expressions from the first parsing module to generate a set of relational events.

15. The method of claim 1, wherein analyzing a number of event messages temporally indicates a trend which by itself does not indicate an immediate negative effect, but the trend indicates a condition ultimately resulting in an error condition.

16. A system of automatic event correlation in a computing environment, the system comprising program code stored on a computer readable medium and executable by a processor to:
   parse an event message to identify an event, and mark the event message if the event is related to a previous event, and add the marked event message to a trail of events;
   parse the trail of events; and
   change the marked event message when parsing the trail of events confirms a condition in the computing environment.

17. The system of claim 16, wherein the program code is further executable to:
   color the event message when a pattern is identified; and
   change the color of the event message when the pattern is a consequence of another event.

18. The system of claim 16, wherein the event message has an event object and corresponding event state.

19. The system of claim 16, further comprising a correlation repository to learn events and automate event correlation.

20. The system of claim 19, wherein the program code is further executable to push correlated events into the correlation repository for future use to adapt and learn continuously.

21. The system of claim 16, wherein the program code is further executable to cluster high relational events.

22. The system of claim 16, wherein the program code is further executable to update a dictionary based on parsing event messages.

23. The system of claim 22, wherein the program code is further executable to access the dictionary to determine event relations.

24. The system of claim 16, further comprising mapping events using a topological classification of event correlations.

25. The system of claim 16, wherein the condition predicts an anomaly.

\* \* \* \* \*